United States Patent
Li et al.

(10) Patent No.: US 12,372,750 B2
(45) Date of Patent: Jul. 29, 2025

(54) OPTICAL IMAGING LENS ASSEMBLY

(71) Applicant: ZHEJIANG SUNNY OPTICS CO., LTD., Yuyao (CN)

(72) Inventors: Long Li, Yuyao (CN); Jianke Wenren, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 489 days.

(21) Appl. No.: 17/164,948

(22) Filed: Feb. 2, 2021

(65) Prior Publication Data
US 2021/0333515 A1    Oct. 28, 2021

(30) Foreign Application Priority Data
Apr. 27, 2020  (CN) .......................... 202010342959.9

(51) Int. Cl.
*G02B 13/00*    (2006.01)
*G02B 5/04*    (2006.01)
(Continued)

(52) U.S. Cl.
CPC ........... *G02B 13/0045* (2013.01); *G02B 5/04* (2013.01); *G02B 9/60* (2013.01); *G02B 27/0025* (2013.01)

(58) Field of Classification Search
CPC ........ G02B 13/0045; G02B 5/04; G02B 9/60; G02B 27/0025; G02B 15/145511; G02B 15/145515; G02B 13/0065; G02B 13/02; G02B 13/06; G02B 13/18; G02B 13/00; G02B 27/00; G02B 15/14; G03B 17/17
(Continued)

(56) References Cited

U.S. PATENT DOCUMENTS

2003/0179464 A1*  9/2003  Amanai ......... G02B 15/144515
                                        359/676
2010/0214664 A1*  8/2010  Chia .................... G02B 13/004
                                        359/678
(Continued)

FOREIGN PATENT DOCUMENTS

CN        1798995 A      7/2006
CN        103543523 A    1/2014
(Continued)

OTHER PUBLICATIONS

Gross et al. "Handbook of Optical Systems Volume 3: Aberration Theory and Correction of Optical Systems" Weinheim Germany, Wiley-VCH Verlag Gmbh & Co. KGaA, pp. 377-379 (Year: 2007).*
(Continued)

*Primary Examiner* — Thomas K Pham
*Assistant Examiner* — Kuei-Jen L Edenfield
(74) *Attorney, Agent, or Firm* — Sughrue Mion, PLLC

(57) ABSTRACT

The present disclosure discloses an optical imaging lens assembly including, sequentially from an object side to an image side along an optical axis, a first lens having negative refractive power; a prism having an incident surface, a reflecting surface, and an exit surface, and an angle between the reflecting surface and the optical axis being 45°; a stop; a second lens having positive refractive power; a third lens having refractive power; a fourth lens having positive refractive power; and a fifth lens having negative refractive power.

13 Claims, 9 Drawing Sheets

(51) Int. Cl.
*G02B 9/60* (2006.01)
*G02B 27/00* (2006.01)

(58) Field of Classification Search
USPC ............... 359/714, 726, 739, 740, 796, 831
See application file for complete search history.

(56) References Cited

U.S. PATENT DOCUMENTS

| | | | |
|---|---|---|---|
| 2011/0044673 A1* | 2/2011 | Kawamura | G03B 17/00 359/676 |
| 2012/0275033 A1* | 11/2012 | Kubota | G02B 15/143505 359/682 |
| 2013/0308206 A1* | 11/2013 | Hsu | G02B 13/0045 359/714 |
| 2016/0139369 A1* | 5/2016 | Jung | G02B 13/0045 359/714 |
| 2018/0299648 A1* | 10/2018 | Hsueh | G02B 9/60 |
| 2019/0187438 A1 | 6/2019 | Hsueh et al. | |
| 2021/0072515 A1* | 3/2021 | Chang | G02B 17/08 |
| 2022/0121014 A1* | 4/2022 | Liu | G02B 9/60 |

FOREIGN PATENT DOCUMENTS

| | | |
|---|---|---|
| CN | 110780422 A | 2/2020 |
| CN | 110794556 A | 2/2020 |
| CN | 212009120 U | 11/2020 |
| JP | 2018-205521 A | 12/2018 |
| KR | 1020180103809 A | 9/2018 |

OTHER PUBLICATIONS

Office Action issued Jan. 10, 2022 in Indian Application No. 202114004931.
Communication dated Dec. 20, 2024 in Chinese Application No. 202010342959.9.
Communication dated Mar. 20, 2025 issued by the State Intellectual Property Office of the P.R. China in application No. 202010342959.9.

* cited by examiner

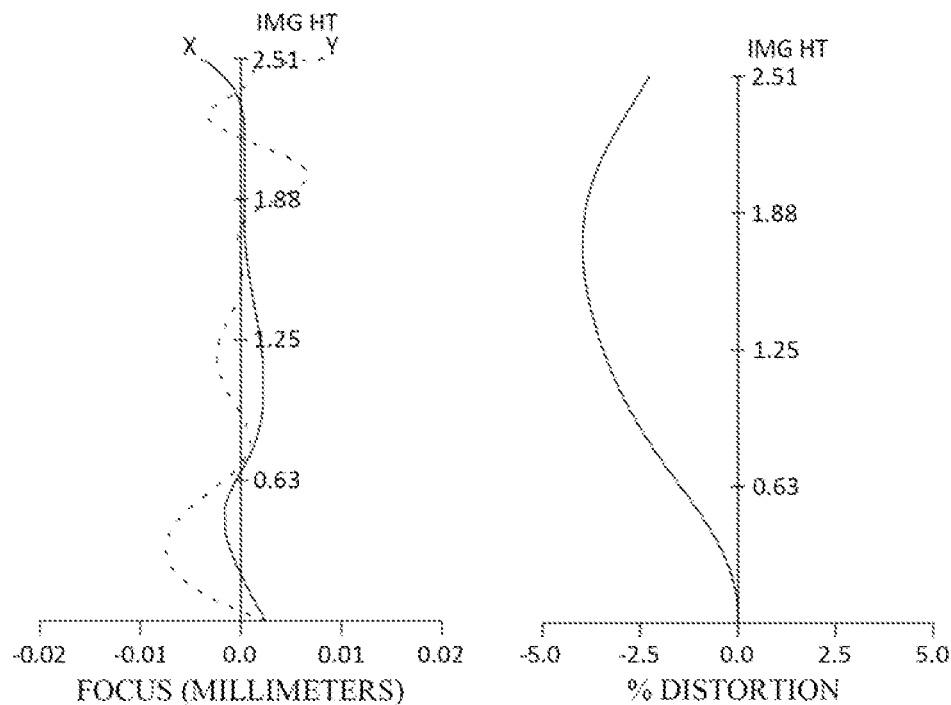
Fig. 4A
Fig. 4B
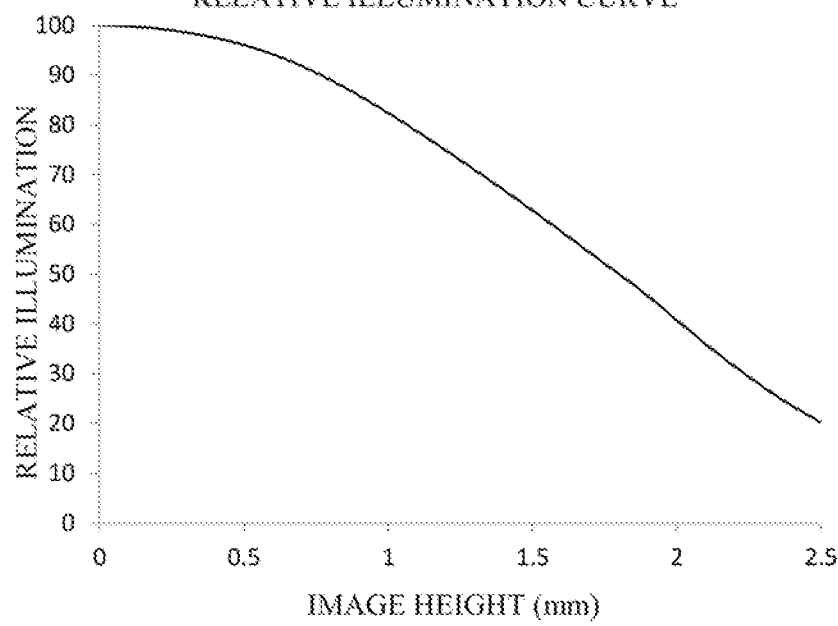
Fig. 4C

OPTICAL IMAGING LENS ASSEMBLY

CROSS-REFERENCE TO RELATED APPLICATION

This application claims benefit of priority to Chinese Patent Application No. 202010342959.9 filed on Apr. 27, 2020 before the China National Intellectual Property Administration, the entire disclosure of which is incorporated herein by reference in its entity.

TECHNICAL FIELD

The present disclosure relates to the field of optical elements, and specifically, relates to an optical imaging lens assembly including five lenses and a prism.

BACKGROUND

Currently, ultra-thin body is one of the selling points of mobile phones in the mobile phone market. Except for special mobile phones, it is difficult to find a mobile phone with a thicker body among commonly used mobile phones. On the other hand, as users have higher and higher requirements for capturing quality, lens assembly applicable to the mobile phones should have high image quality.

In order to meet the high requirements for image quality, most mobile phones sold on the market recently have a "3+1 lens assembly configuration" including a large image plane lens assembly, a wide-angle lens assembly, a telephoto lens assembly and a TOF camera. Particularly, the telephoto lens assembly usually have 5×, 10×, and 15× optical zoom capabilities. If a conventional coaxial telephoto solution is used, in order to meet the long focal length of the telephoto lens assembly, the total optical length (TTL) of the lens assembly will become longer, which may make the mobile phone unable to meet the ultra-thin characteristics. Therefore, an optical imaging lens assembly with a prism has emerged, which may effectively shorten the length of the mobile phone lens in the incident direction of light.

SUMMARY

The present disclosure provides an optical imaging lens assembly, such as an optical imaging lens with ultra-large field-of-view and ultra-thin characteristics, that is applicable to portable electronic products and at least solves or partially solves at least one of the above disadvantages of the prior art.

In one aspect, the present disclosure provides an optical imaging lens assembly which may include, sequentially from an object side to an image side along an optical axis, a first lens having negative refractive power; a prism including an incident surface, a reflecting surface and an exit surface, and an angle between the reflecting surface and the optical axis being 45°; a stop; a second lens having positive refractive power; a third lens having refractive power; a fourth lens having positive refractive power; and a fifth lens having negative refractive power.

In one embodiment, a maximum field-of-view FOV of the optical imaging lens assembly may satisfy: $FOV>92.0°$.

In one embodiment, an effective focal length f2 of the second lens and a combined focal length f34 of the third lens and the fourth lens may satisfy: $-2.50<f34/f2<-0.50$.

In one embodiment, an effective focal length f1 of the first lens and a total effective focal length f of the optical imaging lens assembly may satisfy: $-5.50<f1/f<-1.50$.

In one embodiment, an effective focal length f4 of the fourth lens and a radius of curvature R10 of an image-side surface of the fifth lens may satisfy: $1.50<f4/R10<4.00$.

In one embodiment, a radius of curvature R1 of an object-side surface of the first lens and a radius of curvature R8 of an image-side surface of the fourth lens may satisfy: $1.00<(R1+R8)/(R1-R8)<2.50$.

In one embodiment, a radius of curvature R5 of an object-side surface of the third lens and a radius of curvature R6 of an image-side surface of the third lens may satisfy: $1.00<R5/R6<2.00$.

In one embodiment, a center thickness CT2 of the second lens along the optical axis and a center thickness CT3 of the third lens along the optical axis may satisfy: $1.50<CT2/CT3<4.50$.

In one embodiment, SAG11, being an on-axis distance from an intersection of an object-side surface of the first lens and the optical axis to a vertex of an effective radius of the object-side surface of the first lens, and SAG12, being an on-axis distance from an intersection of an image-side surface of the first lens and the optical axis to a vertex of an effective radius of the image-side surface of the first lens, may satisfy: $1.50<(SAG11+SAG12)/(SAG12-SAG11)<3.00$.

In one embodiment, a maximum effective radius DT11 of an object-side surface of the first lens and a maximum effective radius DT12 of an image-side surface of the first lens may satisfy: $6.00<(DT11+DT12)/(DT11-DT12)<10.50$.

In one embodiment, a maximum effective radius DT51 of an object-side surface of the fifth lens and a maximum effective radius DT52 of an image-side surface of the fifth lens may satisfy: $4.00<(DT51+DT52)/(DT52-DT51)<11.00$.

The optical imaging lens assembly provided by the present disclosure includes a prism and a plurality of lenses, such as the first lens to the fifth lens. By arranging the prism, it may be ensured that an angle between the incident direction of the light and the arrangement direction of the plurality of lenses is 90 degrees, thereby reducing the size of the optical imaging lens assembly in the incident direction of the light (that is, the size in the thickness direction of the device). At the same time, by optimizing the refractive power and surface shape of each lens and increasing the maximum field-of-view of the optical imaging lens assembly, the optical imaging lens assembly has good light convergence ability and is applicable to more types of mobile phone.

BRIEF DESCRIPTION OF THE DRAWINGS

Other Features, Objects, and Advantages of the Present Disclosure Will Become More Apparent from the Following Detailed Description of the Non-Limiting Embodiments with Reference to the Accompanying Drawings. In the Drawings:

FIGS. 4A to 4C illustrate an astigmatic curve, a distortion curve and a relative illumination curve of the optical imaging lens assembly of the example 2, respectively;

DETAILED DESCRIPTION OF EMBODIMENTS

Figure 1:
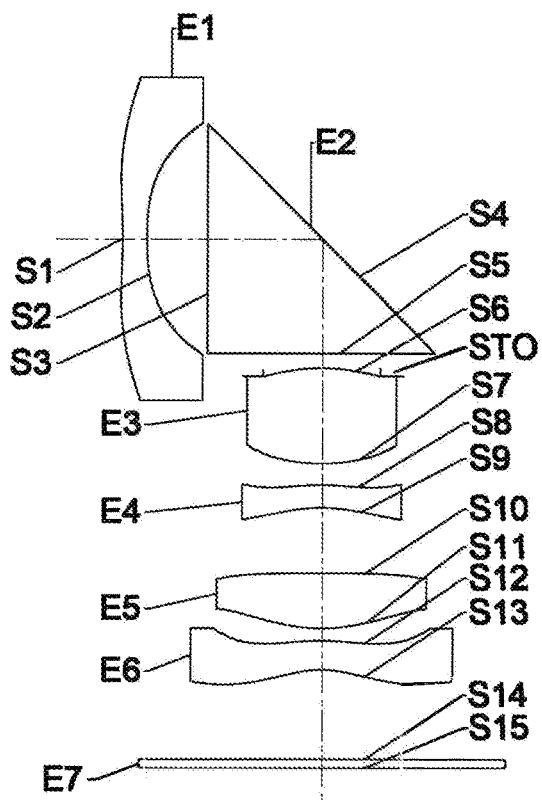
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, sequentially from an object side to an image side along an optical axis, a first lens, a prism, a second lens, a third lens, a fourth lens, and a fifth lens. The prism is arranged such that an angle between a reflecting surface of the prism and the optical axis is 45°. There may be an air interval between adjacent lens and between the prism and the lens.

The prism may be a triangular prism with an incident surface, a reflecting surface and an exit surface. The incident surface and the exit surface are perpendicular to each other, so that the light incident perpendicular to the incident surface exits perpendicular to the exit surface after being changed by 90° via the reflecting surface. The prism is used to make the direction of the light incident on the optical imaging lens assembly perpendicular to the arrangement direction of a plurality of the lenses, so that the length in the longitudinal direction of the mobile phone is used to arrange the plurality of the lenses, avoiding the limitation on the focal length of the lens assembly by the thickness of the mobile phone. Conversely, it is also conducive to the thinner thickness of the mobile phone.

In an exemplary embodiment, the first lens may have negative refractive power; the second lens may have positive refractive power; the third lens may have positive or negative refractive power; the fourth lens may have positive refractive power; and the fifth lens may have negative refractive power. By reasonably configuring the refractive power and surface shape of each lens in the optical system, the maximum field-of-view of the optical imaging lens assembly may be effectively expanded, so that the optical system has good light convergence ability.

In an exemplary embodiment, an object-side surface of the first lens may be concave.

In an exemplary embodiment, an object-side surface of the second lens may be convex, and an image-side surface thereof may be convex.

In an exemplary embodiment, an object-side surface of the third lens may be convex, and an image-side surface of the third lens may be concave.

In an exemplary embodiment, an image-side surface of the fourth lens may be convex.

In an exemplary embodiment, an image-side surface of the fifth lens may be concave.

In an exemplary embodiment, a maximum field-of-view FOV of the optical imaging lens assembly may satisfy: FOV>92.0°. For example, 92°<FOV<110.0°. By increasing the maximum field-of-view of the optical imaging lens assembly, it is possible to configure more types of camera modules on the mobile phone, which greatly expands the application scope of the optical imaging lens assembly with the prism having the optical path turning function.

In an exemplary embodiment, an effective focal length f2 of the second lens and a combined focal length f34 of the third lens and the fourth lens may satisfy: $-2.50<f34/f2<-0.50$. By controlling the ratio of the effective focal length of the second lens to the combined focal length of the third lens and the fourth lens within a reasonable value range, and cooperating with the first lens, the maximum field-of-view of the optical imaging lens assembly may be increased more effectively.

In an exemplary embodiment, an effective focal length f1 of the first lens and a total effective focal length f of the optical imaging lens assembly may satisfy: $-5.50<f1/f<-1.50$. The first lens with negative refractive power is the key to increase the maximum field-of-view of the optical imaging lens assembly. By controlling the effective focal length of the first lens within a reasonable value range, it is possible to increase the maximum field-of-view while avoiding the size of the prism of the optical imaging lens assembly being too large, which is beneficial to reduce the size of the optical imaging lens assembly.

In an exemplary embodiment, an effective focal length f4 of the fourth lens and a radius of curvature R10 of an image-side surface of the fifth lens may satisfy: $1.50<f4/R10<4.00$. For example, $1.60<f4/R10<3.60$. By controlling the ratio of the effective focal length of the fourth lens to the radius of curvature of the image-side surface of the fifth lens within a reasonable value range, the optical system may have good light convergence ability while effectively increasing the maximum field-of-view of the optical imaging lens assembly, and problems such as processing difficulty due to the radius of curvature of the image-side surface of the fifth lens being too small may be avoided.

In an exemplary embodiment, a radius of curvature R1 of an object-side surface of the first lens and a radius of curvature R8 of an image-side surface of the fourth lens may satisfy: $1.00<(R1+R8)/(R1-R8)<2.50$. For example, $1.40<(R1+R8)/(R1-R8)<2.20$. By reasonably controlling the radius of curvature of the object-side surface of the first lens and the radius of curvature of the image-side surface of the fourth lens, it is possible to increase the maximum field-of-view of the optical imaging lens assembly while keeping the prism of the optical imaging lens assembly in a small size, which is beneficial to reduce the lateral size of the optical imaging lens assembly (that is, the size in the thickness direction).

In an exemplary embodiment, a radius of curvature R5 of an object-side surface of the third lens and a radius of curvature R6 of an image-side surface of the third lens may satisfy: $1.00<R5/R6<2.00$. By controlling the ratio of the radii of curvature of the object-side surface and the image-side surface of the third lens to a reasonable value range, it is possible to ensure that the optical system has better aberration correction capability and better workability. The third lens is superior to other lenses in terms of eccentricity and the sensibility of the curvature radius. Therefore, by appropriately controlling the magnitude of the radii of curvature of the object-side surface and the image-side surface of the third lens, it is very beneficial to improve the processability and yield of the optical imaging lens assembly.

In an exemplary embodiment, a center thickness CT2 of the second lens along the optical axis and a center thickness CT3 of the third lens along the optical axis may satisfy: $1.50<CT2/CT3<4.50$. For example, $1.90<CT2/CT3<4.50$. Controlling the ratio of the center thickness of the second lens along the optical axis to the center thickness of the third lens along the optical axis within a reasonable value range may achieve the following beneficial effects: 1) avoid excessive long longitudinal dimension of the optical imaging lens assembly due to the thickness of the second lens being too thick; 2) avoid problems such as increased sensitivity and processing difficulties of the third lens due to the third lens being too thin; and 3) avoid the ratio of the center thicknesses of the second lens and the third lens along the optical axis being too small, which is beneficial to improve the aberration correction capability of the optical system, so that the optical imaging lens assembly has better image quality.

In an exemplary embodiment, SAG11, being an on-axis distance from an intersection of an object-side surface of the first lens and the optical axis to a vertex of an effective radius of the object-side surface of the first lens, and SAG12, being an on-axis distance from an intersection of an image-side surface of the first lens and the optical axis to a vertex of an effective radius of the image-side surface of the first lens, may satisfy: $1.50<(SAG11+SAG12)/(SAG12-SAG11)<3.00$. By reasonably controlling the sagittal heights of the object-side surface and the image-side surface of the first lens, the maximum field-of-view of the optical imaging lens assembly may be increased while avoiding the prism of the optical system oversize (which is not beneficial to reduce the lateral size of the optical imaging lens assembly) due to the sum of the sagittal heights of the object-side surface and the image-side surface of the first lens being too large or the difference between the sagittal heights of the object-side surface and the image-side surface of the first lens being too large. In addition, it is possible to avoid the problems that the maximum field-of-view of the optical imaging lens assembly cannot be effectively increased and the sensitivity of the first lens is increased (which may cause difficulties in lens processing) due to the sum of the sagittal heights of the object-side surface and the image-side surface of the first lens being too small or the difference of the sagittal heights of the object-side surface and the image-side surface of the first lens being too small.

In an exemplary embodiment, a maximum effective radius DT11 of an object-side surface of the first lens and a maximum effective radius DT12 of an image-side surface of the first lens may satisfy: $6.00<(DT11+DT12)/(DT11-DT12)<10.50$. By reasonably controlling the maximum effective radii of the object-side surface and the image-side surface of the first lens, it is beneficial to increase the maximum field-of-view of the optical imaging lens assembly and reduce the sensitivity of the first lens. At the same time, the lateral size of the optical imaging lens assembly may be effectively reduced, and the using scope of the optical imaging lens assembly may be broadened.

In an exemplary embodiment, a maximum effective radius DT51 of an object-side surface of the fifth lens and a maximum effective radius DT52 of an image-side surface of the fifth lens may satisfy: $4.00<(DT51+DT52)/(DT52-DT51)<11.00$. By reasonably controlling the maximum effective radii of the object-side surface and the image-side surface of the fifth lens, the edge aberration may be effectively corrected and the image height of the optical imaging lens assembly may be improved.

In an exemplary embodiment, the above optical imaging lens assembly may further include a stop. The stop may be disposed at an appropriate position as required. For example, the stop may be disposed between the prism and the second lens. Optionally, the above optical imaging lens assembly may further include an optical filter for correcting the color deviation and/or a protective glass for protecting the photosensitive element located on an imaging plane.

The present disclosure proposes an optical imaging lens assembly with the characteristics of ultra-large field-of-view and ultra-thinness. The optical imaging lens assembly according to the above embodiments of the present disclosure may employ a plurality of lenses, such as five lenses as described above. By properly configuring the refractive power of each lens, the surface shape, the center thickness of each lens, and spaced intervals along the optical axis between the lenses, the incident light may be effectively converged, the total optical length of the imaging lens assembly may be reduced, and the workability of the imaging lens assembly may be improved, such that the optical imaging lens assembly is more advantageous for production processing. In addition, by using a prism, the lateral size of the lens assembly may be effectively shortened, which is beneficial to the ultra-thinness of the portable electronic products, such as mobile phones.

In an exemplary embodiment, at least one of the surfaces of the lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking five lenses as an example, the optical imaging lens assembly is not limited to include five lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2C. FIG. 1 is a schematic structural view of the optical imaging lens assembly according to example 1 of the present disclosure.

As shown in FIG. 1, the optical imaging lens assembly includes a first lens E1, a prism E2, a stop STO, a second lens E3, a third lens E4, a fourth lens E5, a fifth lens E6 and an optical filter E7, which are sequentially arranged from an object side to an image side along an optical axis.

The first lens E1 has negative refractive power, an object-side surface S1 thereof is concave, and an image-side surface S2 thereof is concave. An incident surface S3, a reflecting surface S4 and an exit surface S5 of the prism E2 are spherical. The reflecting surface S4 is at 45° with the optical axis, so that the light incident perpendicular to the incident surface S3 of the prism E2 is deflected by 90° by the reflecting surface S4 and then exits from the prism E2 perpendicular to the exit surface S5. The second lens E3 has positive refractive power, an object-side surface S6 thereof is convex, and an image-side surface S7 thereof is convex. The third lens E4 has negative refractive power, an object-side surface S8 thereof is convex, and an image-side surface S9 thereof is concave. The fourth lens E5 has positive refractive power, an object-side surface S10 thereof is convex, and an image-side surface S11 thereof is convex. The fifth lens E6 has negative refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on an imaging plane S16 (not shown).

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −4.9979 | 0.2978 | 1.55 | 56.1 | −4.08 | 4.8902 |
| S2 | Aspheric | 4.0946 | 0.7503 | | | | −6.7637 |
| S3 | Spherical | Infinite | 1.4100 | 1.52 | 64.2 | | |
| S4 | Spherical | Infinite | 1.4100 | 1.52 | 64.2 | | |
| S5 | Spherical | Infinite | 0.2713 | | | | |
| STO | Spherical | Infinite | −0.0990 | | | | |
| S6 | Aspheric | 2.3349 | 1.1744 | 1.55 | 56.1 | 2.39 | 0.5516 |
| S7 | Aspheric | −2.4431 | 0.2635 | | | | 1.2091 |
| S8 | Aspheric | 3.2125 | 0.2765 | 1.67 | 20.4 | −46.74 | −54.6085 |
| S9 | Aspheric | 1.8094 | 0.8068 | | | | −6.2883 |

TABLE 1-continued

| Surface number | Surface type | Radius of curvature | Thickness/ Distance | Material Refractive index | Abbe number | Focal length | Conic coefficient |
|---|---|---|---|---|---|---|---|
| S10 | Aspheric | 530.8840 | 0.6718 | 1.55 | 56.1 | 3.26 | −28.4367 |
| S11 | Aspheric | −1.7831 | 0.1492 | | | | −0.8129 |
| S12 | Aspheric | 3.1967 | 0.3578 | 1.67 | 20.4 | −3.31 | −1.7127 |
| S13 | Aspheric | 1.2479 | 1.1001 | | | | −6.7816 |
| S14 | Spherical | Infinite | 0.1100 | 1.52 | 64.2 | | |
| S15 | Spherical | Infinite | 0.4000 | | | | |
| S16 | Spherical | Infinite | | | | | |

In this example, a total effective focal length f of the optical imaging lens assembly satisfies f=2.36 mm, half of a diagonal length ImgH of an effective pixel area on the imaging plane S16 satisfies ImgH=2.50 mm, half of a maximum field-of-view Semi-FOV of the optical imaging lens assembly satisfies Semi-FOV=46.7°, and an aperture value Fno of the optical imaging lens assembly satisfies Fno=2.88.

In example 1, the object-side surface and the image-side surface of any one of the first lens E1 to the fifth lens E6 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface in example 1.

TABLE 2

| Surface number | A4 | A6 | A8 | A10 | A12 |
|---|---|---|---|---|---|
| S1 | 1.6555E−01 | −1.3194E−01 | 1.2734E−01 | −1.1776E−01 | 8.7689E−02 |
| S2 | 1.9683E−01 | −1.4170E−01 | 2.5052E−01 | −4.6261E−01 | 6.7069E−01 |
| S6 | 2.9758E−02 | 1.0462E−01 | −2.3891E+00 | 3.6486E+01 | −3.2973E+02 |
| S7 | 4.3077E−02 | −1.1565E−03 | 1.3074E−01 | −1.9186E+00 | 1.4015E+01 |
| S8 | 3.8745E−03 | 5.3374E−01 | −2.0038E+00 | 7.6084E+00 | −2.5554E+01 |
| S9 | 6.4903E−02 | 7.1524E−02 | −3.9079E−01 | 1.8499E+00 | −7.1499E+00 |
| S10 | −1.8726E−02 | −2.7570E−01 | 1.8791E+00 | −6.9245E+00 | 1.6659E+01 |
| S11 | −2.4049E−01 | 2.4501E−01 | 1.1357E−01 | −5.7080E−01 | −3.2332E−01 |
| S12 | 1.6414E−01 | −1.0024E−01 | 5.7915E−01 | −1.5349E+00 | 2.1178E+00 |
| S13 | 1.0114E−01 | −5.5139E−02 | 2.1856E−01 | −6.2877E−01 | 1.0391E+00 |

| Surface number | A14 | A16 | A18 | A20 |
|---|---|---|---|---|
| S1 | −4.8216E−02 | 1.8818E−02 | −5.0375E−03 | 8.7714E−04 |
| S2 | −7.0792E−01 | 5.2796E−01 | −2.6894E−01 | 8.8531E−02 |
| S6 | 1.9084E+03 | −7.3205E+03 | 1.8804E+04 | −3.1949E+04 |
| S7 | −5.9447E+01 | 1.6200E+02 | −2.9361E+02 | 3.5275E+02 |
| S8 | 6.7255E+01 | −1.2784E+02 | 1.6542E+02 | −1.3687E+02 |
| S9 | 1.9562E+01 | −3.6393E+01 | 4.4612E+01 | −3.4355E+01 |
| S10 | −2.7563E+01 | 3.1874E+01 | −2.5704E+01 | 1.4155E+01 |
| S11 | 3.4761E+00 | −6.8901E+00 | 7.3952E+00 | −4.8590E+00 |
| S12 | −1.4467E+00 | 1.1610E−02 | 8.5348E−01 | −7.4850E−01 |
| S13 | −1.1047E+00 | 7.9347E−01 | −3.9008E−01 | 1.2955E−01 |

Figures 2A, 2B:
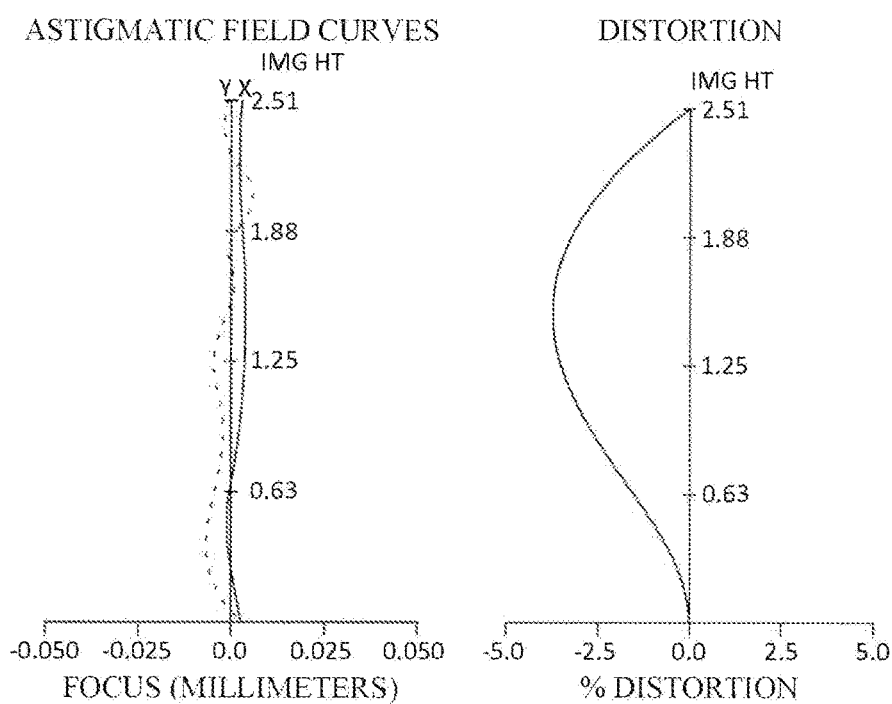
FIGS. 2A to 2C illustrate an astigmatic curve, a distortion curve and a relative illumination curve of the optical imaging lens assembly of the example 1, respectively.
Figure 2C:
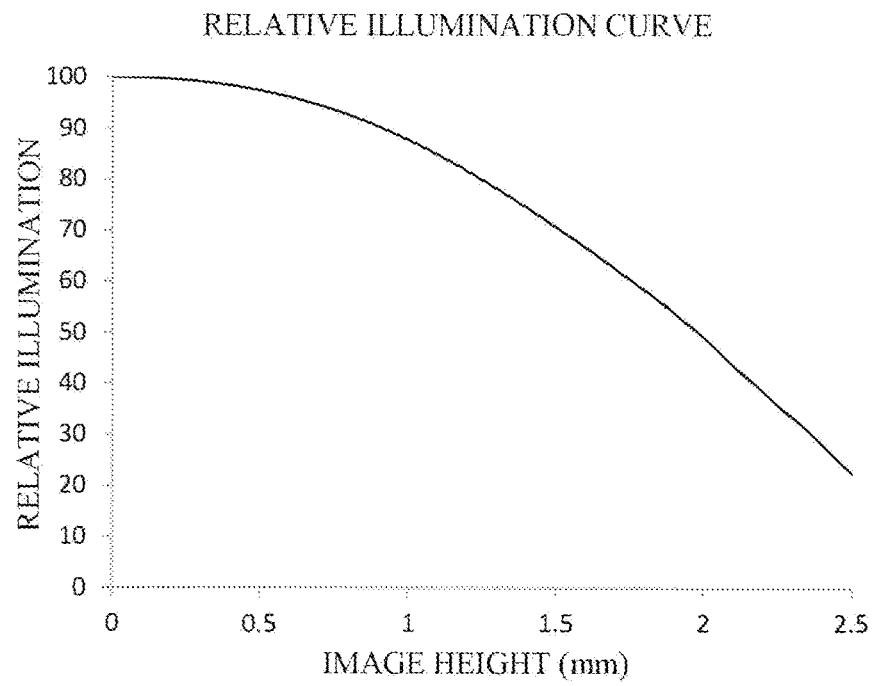

FIG. 2A illustrates the astigmatic curves of the optical imaging lens assembly according to example 1, representing the curvatures of the tangential plane and the curvatures of the sagittal plane. FIG. 2B illustrates a distortion curve of the optical imaging lens assembly according to example 1, representing the amounts of distortion corresponding to different image heights. FIG. 2C illustrates a relative illumination curve of the optical imaging lens assembly according to example 1, representing the relative illumination values corresponding to different image heights. It can be seen from FIG. 2A to FIG. 2C that the optical imaging lens assembly provided in example 1 may achieve good image quality.

Example 2

Figure 3:
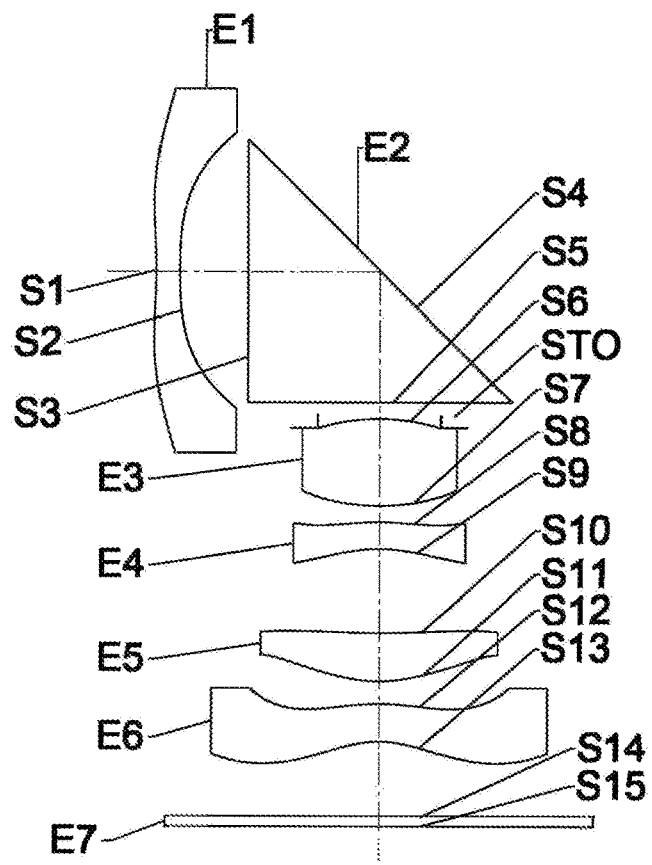
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4C. FIG. 3 is a schematic structural view of the optical imaging lens assembly according to example 2 of the present disclosure.

As shown in FIG. 3, the optical imaging lens assembly includes a first lens E1, a prism E2, a stop STO, a second lens E3, a third lens E4, a fourth lens E5, a fifth lens E6 and an optical filter E7, which are sequentially arranged from an object side to an image side along an optical axis.

The first lens E1 has negative refractive power, an object-side surface S1 thereof is concave, and an image-side surface S2 thereof is concave. An incident surface S3, a reflecting surface S4 and an exit surface S5 of the prism E2 are spherical. The reflecting surface S4 is at 45° with the optical axis, so that the light incident perpendicular to the incident surface S3 of the prism E2 is deflected by 90° by the reflecting surface S4 and then exits from the prism E2 perpendicular to the exit surface S5. The second lens E3 has positive refractive power, an object-side surface S6 thereof is convex, and an image-side surface S7 thereof is convex. The third lens E4 has negative refractive power, an object-side surface S8 thereof is convex, and an image-side surface S9 thereof is concave. The fourth lens E5 has positive refractive power, an object-side surface S10 thereof is concave, and an image-side surface S11 thereof is convex. The fifth lens E6 has negative refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on an imaging plane S16 (not shown).

In this example, a total effective focal length f of the optical imaging lens assembly satisfies f=2.33 mm, half of a diagonal length ImgH of an effective pixel area on the imaging plane S16 satisfies ImgH=2.50 mm, half of a maximum field-of-view Semi-FOV of the optical imaging lens assembly satisfies Semi-FOV=47.6°, and an aperture value Fno of the optical imaging lens assembly satisfies Fno=2.80.

Table 3 is a table illustrating basic parameters of the optical imaging lens assembly of example 2, wherein the units for the radius of curvature, the thickness/distance and the focal length are millimeter (mm).

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.0014 | 0.2481 | 1.55 | 56.1 | −5.30 | 4.8814 |
| S2 | Aspheric | 6.9815 | 0.7326 | | | | −21.1016 |
| S3 | Spherical | Infinite | 1.4100 | 1.52 | 64.2 | | |
| S4 | Spherical | Infinite | 1.4100 | 1.52 | 64.2 | | |
| S5 | Spherical | Infinite | 0.2713 | | | | |
| STO | Spherical | Infinite | −0.0963 | | | | |
| S6 | Aspheric | 2.1335 | 0.9337 | 1.55 | 56.1 | 2.32 | 0.6787 |
| S7 | Aspheric | −2.6273 | 0.1755 | | | | 1.4490 |
| S8 | Aspheric | 2.8271 | 0.2872 | 1.67 | 20.4 | −6.38 | −53.0848 |
| S9 | Aspheric | 1.6293 | 0.8977 | | | | −6.2811 |
| S10 | Aspheric | −7.7895 | 0.5171 | 1.55 | 56.1 | 3.36 | −28.4367 |
| S11 | Aspheric | −1.5180 | 0.2412 | | | | −0.9663 |
| S12 | Aspheric | 2.5073 | 0.4042 | 1.67 | 20.4 | −3.24 | −2.4485 |
| S13 | Aspheric | 1.0864 | 0.8001 | | | | −4.8407 |
| S14 | Spherical | Infinite | 0.1100 | 1.52 | 64.2 | | |
| S15 | Spherical | Infinite | 0.3000 | | | | |
| S16 | Spherical | Infinite | | | | | |

In example 2, the object-side surface and the image-side surface of any one of the first lens E1 to the fifth lens E6 are aspheric. Table 4 below shows high-order coefficients A4, A6, A8, A10, A12, A14, A16, A18 and A20 applicable to each aspheric surface in example 2, wherein the surface shape of each aspheric surface may be defined by the formula (1) given in the above example 1.

TABLE 4

| Surface number | A4 | A6 | A8 | A10 | A12 |
|---|---|---|---|---|---|
| S1 | 1.6719E−01 | −1.4721E−01 | 1.6311E−01 | −1.6148E−01 | 1.2090E−01 |
| S2 | 1.8508E−01 | −1.2291E−01 | 1.0427E−01 | 4.8852E−04 | −1.7624E−01 |
| S6 | 1.9157E−02 | 1.2447E−01 | 2.5175E+00 | −1.0394E+02 | 1.5457E+03 |
| S7 | 6.8856E−02 | −1.8751E−01 | 1.9590E+00 | −2.1743E+01 | 1.6215E+02 |
| S8 | −4.8154E−03 | 5.7896E−01 | −1.5347E+00 | 8.9715E−01 | 1.1632E+01 |
| S9 | 9.5536E−02 | −2.7190E−01 | 2.3903E+00 | −1.4056E+01 | 5.4309E+01 |
| S10 | 6.6889E−03 | −8.2748E−01 | 5.1399E+00 | −1.8322E+01 | 4.3356E+01 |
| S11 | −2.0919E−01 | 9.9323E−02 | −1.7192E−01 | 3.1965E+00 | −1.3672E+01 |
| S12 | 1.4522E−01 | −7.5990E−03 | 1.2108E−01 | −6.5783E−03 | −8.7071E−01 |
| S13 | 9.3984E−02 | −1.1991E−02 | 6.7798E−02 | −2.1710E−01 | 3.1778E−01 |

| Surface number | A14 | A16 | A18 | A20 |
|---|---|---|---|---|
| S1 | −6.4911E−02 | 2.4456E−02 | −6.2987E−03 | 1.0554E−03 |
| S2 | 2.8163E−01 | −2.3731E−01 | 1.2191E−01 | −3.8349E−02 |
| S6 | −1.2895E+04 | 6.7505E+04 | −2.3049E+05 | 5.1379E+05 |
| S7 | −7.8820E+02 | 2.5713E+03 | −5.6844E+03 | 8.4030E+03 |
| S8 | −5.3691E+01 | 1.2573E+02 | −1.8354E+02 | 1.6992E+02 |
| S9 | −1.4220E+02 | 2.5457E+02 | −3.0751E+02 | 2.3991E+02 |
| S10 | −7.1197E+01 | 8.2254E+01 | −6.6596E+01 | 3.6963E+01 |
| S11 | 3.0298E+01 | −4.1688E+01 | 3.7640E+01 | −2.2407E+01 |
| S12 | 2.1707E+00 | −2.7644E+00 | 2.1714E+00 | −1.0953E+00 |
| S13 | −2.8137E−01 | 1.6386E−01 | −6.4231E−02 | 1.6784E−02 |

FIG. 4A illustrates the astigmatic curves of the optical imaging lens assembly according to example 2, representing the curvatures of a tangential plane and the curvatures of a sagittal plane. FIG. 4B illustrates a distortion curve of the optical imaging lens assembly according to example 2, representing the amounts of distortion corresponding to different image heights. FIG. 4C illustrates a relative illumination curve of the optical imaging lens assembly according to example 2, representing the relative illumination values corresponding to different image heights. It can be seen from FIG. 4A to FIG. 4C that the optical imaging lens assembly provided in example 2 may achieve good image quality.

Example 3

Figure 5:
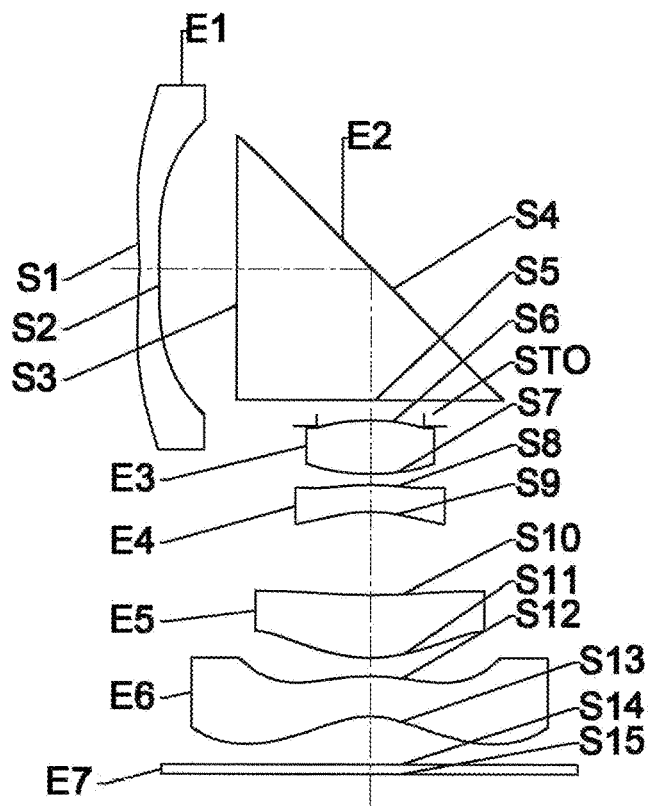
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6C. FIG. 5 is a schematic structural view of the optical imaging lens assembly according to example 3 of the present disclosure.

As shown in FIG. 5, the optical imaging lens assembly includes a first lens E1, a prism E2, a stop STO, a second lens E3, a third lens E4, a fourth lens E5, a fifth lens E6 and an optical filter E7, which are sequentially arranged from an object side to an image side along an optical axis.

The first lens E1 has negative refractive power, an object-side surface S1 thereof is concave, and an image-side surface S2 thereof is convex. An incident surface S3, a reflecting surface S4 and an exit surface S5 of the prism E2 are spherical. The reflecting surface S4 is at 45° with the optical axis, so that the light incident perpendicular to the incident surface S3 of the prism E2 is deflected by 90° by the reflecting surface S4 and then exits from the prism E2 perpendicular to the exit surface S5. The second lens E3 has positive refractive power, an object-side surface S6 thereof is convex, and an image-side surface S7 thereof is convex. The third lens E4 has negative refractive power, an object-side surface S8 thereof is convex, and an image-side surface S9 thereof is concave. The fourth lens E5 has positive refractive power, an object-side surface S10 thereof is concave, and an image-side surface S11 thereof is convex. The fifth lens E6 has negative refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on an imaging plane S16 (not shown).

In this example, a total effective focal length f of the optical imaging lens assembly satisfies f=2.39 mm, half of a diagonal length ImgH of an effective pixel area on the imaging plane S16 satisfies ImgH=2.45 mm, half of a maximum field-of-view Semi-FOV of the optical imaging lens assembly satisfies Semi-FOV=48.7°, and an aperture value Fno of the optical imaging lens assembly satisfies Fno=2.70.

Table 5 is a table illustrating basic parameters of the optical imaging lens assembly of example 3, wherein the units for the radius of curvature, the thickness/distance and the focal length are millimeter (mm).

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.2524 | 0.2200 | 1.55 | 56.1 | −10.00 | 4.8768 |
| S2 | Aspheric | −140.6561 | 0.8742 | | | | 99.0000 |
| S3 | Spherical | Infinite | 1.5028 | 1.52 | 64.2 | | |
| S4 | Spherical | Infinite | 1.5028 | 1.52 | 64.2 | | |
| S5 | Spherical | Infinite | 0.2713 | | | | |
| STO | Spherical | Infinite | −0.0666 | | | | |
| S6 | Aspheric | 2.1191 | 0.6032 | 1.55 | 56.1 | 2.25 | 0.8607 |
| S7 | Aspheric | −2.6345 | 0.1229 | | | | 1.3940 |
| S8 | Aspheric | 2.5618 | 0.3017 | 1.67 | 20.4 | −5.99 | −52.3357 |
| S9 | Aspheric | 1.4872 | 0.9294 | | | | −6.3373 |
| S10 | Aspheric | −5.4091 | 0.7061 | 1.55 | 56.1 | 3.35 | −28.5807 |
| S11 | Aspheric | −1.4297 | 0.2009 | | | | −1.0064 |
| S12 | Aspheric | 2.2457 | 0.4518 | 1.67 | 20.4 | −2.91 | −2.6812 |
| S13 | Aspheric | 0.9577 | 0.5397 | | | | −4.2034 |
| S14 | Spherical | Infinite | 0.1100 | 1.52 | 64.2 | | |
| S15 | Spherical | Infinite | 0.1548 | | | | |
| S16 | Spherical | Infinite | | | | | |

In example 3, the object-side surface and the image-side surface of any one of the first lens E1 to the fifth lens E6 are aspheric. Table 6 below shows high-order coefficients A4, A6, A8, A10, A12, A14, A16, A18 and A20 applicable to each aspheric surface in example 3, wherein the surface shape of each aspheric surface may be defined by the formula (1) given in the above example 1.

TABLE 6

| Surface number | A4 | A6 | A8 | A10 | A12 |
|---|---|---|---|---|---|
| S1 | 1.4473E−01 | −1.2708E−01 | 1.5326E−01 | −1.5977E−01 | 1.1957E−01 |
| S2 | 1.6128E−01 | −1.7866E−01 | 3.1859E−01 | −4.3584E−01 | 3.9584E−01 |
| S6 | 3.0296E−02 | −8.1542E−01 | 2.1989E+01 | −3.4046E+02 | 3.3698E+03 |
| S7 | 1.1522E−01 | −5.4828E−01 | 2.3720E+00 | −1.9074E+01 | 2.2620E+02 |
| S8 | −1.3388E−02 | 1.0680E+00 | −9.8721E+00 | 7.9773E+01 | −4.7710E+02 |
| S9 | 9.3933E−02 | 2.2010E−02 | −1.7114E+00 | 1.4714E+01 | −7.3825E+01 |
| S10 | −5.6828E−02 | 3.4914E−04 | 4.8122E−02 | 1.3763E+00 | −8.0769E+00 |
| S11 | −1.8253E−01 | −3.3264E−01 | 3.0642E+00 | −1.1032E+01 | 2.5776E+01 |
| S12 | 1.5565E−01 | −7.2426E−02 | 5.2497E−02 | 1.1039E+00 | −4.4980E+00 |
| S13 | 5.9728E−02 | 5.2953E−02 | −1.1370E−03 | −2.1537E−01 | 3.9657E−01 |

| Surface number | A14 | A16 | A18 | A20 |
|---|---|---|---|---|
| S1 | −6.1709E−02 | 2.1732E−02 | −5.1271E−03 | 7.7540E−04 |
| S2 | −2.3366E−01 | 8.7576E−02 | −1.9428E−02 | 2.0344E−03 |
| S6 | −2.2115E+04 | 9.7901E+04 | −2.9191E+05 | 5.7309E+05 |
| S7 | −1.9108E+03 | 1.0471E+04 | −3.7487E+04 | 8.7249E+04 |
| S8 | 2.0080E+03 | −5.8038E+03 | 1.1229E+04 | −1.3865E+04 |
| S9 | 2.4532E+02 | −5.5298E+02 | 8.3896E+02 | −8.2340E+02 |
| S10 | 2.2198E+01 | −3.7188E+01 | 4.0653E+01 | −2.9228E+01 |
| S11 | −4.2068E+01 | 4.8506E+01 | −3.9218E+01 | 2.1701E+01 |
| S12 | 8.6366E+00 | −9.9947E+00 | 7.4602E+00 | −3.6261E+00 |
| S13 | −3.7766E−01 | 2.2471E−01 | −8.7826E−02 | 2.2590E−02 |

Figures 6A, 6B:
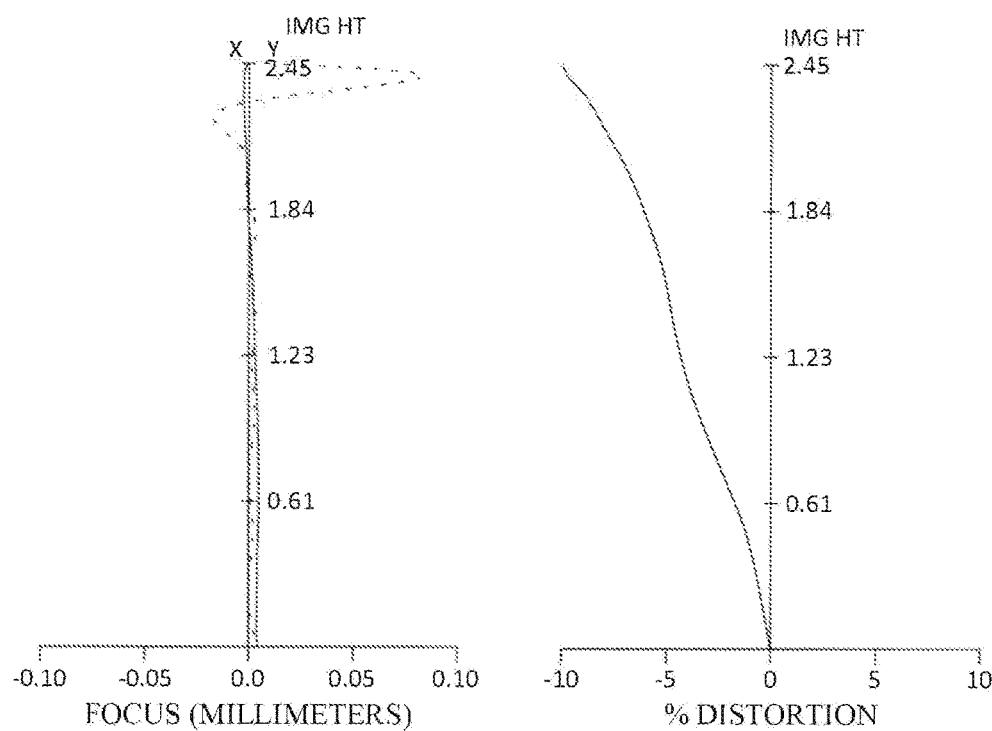
FIGS. 6A to 6C illustrate an astigmatic curve, a distortion curve and a relative illumination curve of the optical imaging lens assembly of the example 3, respectively.
Figure 6C:
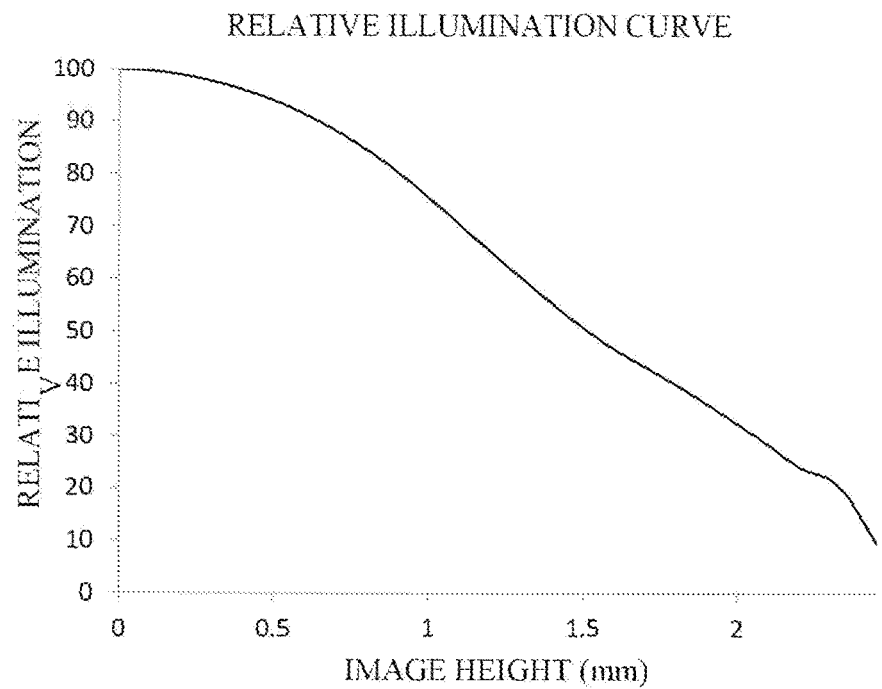

FIG. 6A illustrates the astigmatic curves of the optical imaging lens assembly according to example 3, representing the curvatures of a tangential plane and the curvatures of a sagittal plane. FIG. 6B illustrates a distortion curve of the optical imaging lens assembly according to example 3, representing the amounts of distortion corresponding to different image heights. FIG. 6C illustrates a relative illumination curve of the optical imaging lens assembly according to example 3, representing the relative illumination values corresponding to different image heights. It can be seen from FIG. 6A to FIG. 6C that the optical imaging lens assembly provided in example 3 may achieve good image quality.

Example 4

Figure 7:
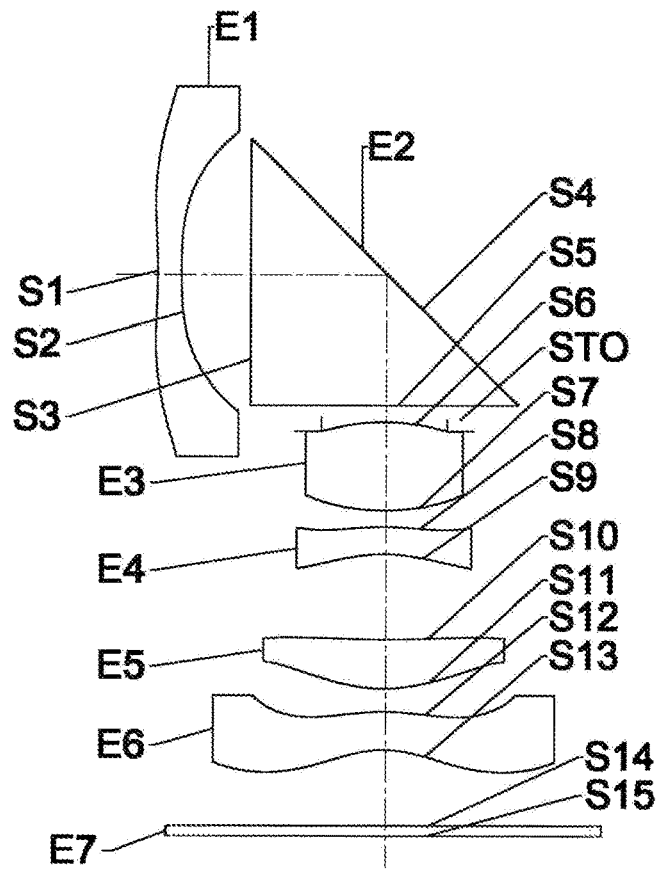
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8C. FIG. 7 is a schematic structural view of the optical imaging lens assembly according to example 4 of the present disclosure.

As shown in FIG. 7, the optical imaging lens assembly includes a first lens E1, a prism E2, a stop STO, a second lens E3, a third lens E4, a fourth lens E5, a fifth lens E6 and an optical filter E7, which are sequentially arranged from an object side to an image side along an optical axis.

The first lens E1 has negative refractive power, an object-side surface S1 thereof is concave, and an image-side surface S2 thereof is concave. An incident surface S3, a reflecting surface S4 and an exit surface S5 of the prism E2 are spherical. The reflecting surface S4 is at 45° with the optical axis, so that the light incident perpendicular to the incident surface S3 of the prism E2 is deflected by 90° by the reflecting surface S4 and then exits from the prism E2 perpendicular to the exit surface S5. The second lens E3 has positive refractive power, an object-side surface S6 thereof is convex, and an image-side surface S7 thereof is convex. The third lens E4 has positive refractive power, an object-side surface S8 thereof is convex, and an image-side surface S9 thereof is concave. The fourth lens E5 has positive refractive power, an object-side surface S10 thereof is concave, and an image-side surface S11 thereof is convex. The fifth lens E6 has negative refractive power, an object-side surface S12 thereof is convex, and an image-side surface S13 thereof is concave. The optical filter E7 has an object-side surface S14 and an image-side surface S15. Light from an object sequentially passes through the respective surfaces S1 to S15 and is finally imaged on an imaging plane S16 (not shown).

In this example, a total effective focal length f of the optical imaging lens assembly satisfies f=2.12 mm, half of a diagonal length ImgH of an effective pixel area on the imaging plane S16 satisfies ImgH=2.39 mm, half of a maximum field-of-view Semi-FOV of the optical imaging lens assembly satisfies Semi-FOV=52.1°, and an aperture value Fno of the optical imaging lens assembly satisfies Fno=2.60.

Table 7 is a table illustrating basic parameters of the optical imaging lens assembly of example 4, wherein the units for the radius of curvature, the thickness/distance and the focal length are millimeter (mm).

TABLE 7

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −5.2552 | 0.2900 | 1.55 | 56.1 | −7.30 | 4.8729 |
| S2 | Aspheric | 16.8015 | 0.6152 | | | | 61.9522 |
| S3 | Spherical | Infinite | 1.5560 | 1.52 | 64.2 | | |
| S4 | Spherical | Infinite | 1.5560 | 1.52 | 64.2 | | |
| S5 | Spherical | Infinite | 0.2713 | | | | |
| STO | Spherical | Infinite | −0.0655 | | | | |
| S6 | Aspheric | 2.0574 | 1.0819 | 1.55 | 56.1 | 2.69 | 0.5707 |
| S7 | Aspheric | −4.2035 | 0.0584 | | | | 8.4477 |
| S8 | Aspheric | 2.1928 | 0.2500 | 1.67 | 20.4 | 499.29 | −43.4200 |
| S9 | Aspheric | 2.1066 | 0.7630 | | | | −6.4631 |
| S10 | Aspheric | −3.8087 | 0.6181 | 1.55 | 56.1 | 2.29 | −4.1692 |
| S11 | Aspheric | −0.9958 | 0.0134 | | | | −0.9992 |
| S12 | Aspheric | 18.1780 | 0.7151 | 1.67 | 20.4 | −1.71 | −3.1313 |
| S13 | Aspheric | 1.0566 | 0.5262 | | | | −6.4870 |
| S14 | Spherical | Infinite | 0.1100 | 1.52 | 64.2 | | |
| S15 | Spherical | Infinite | 0.1751 | | | | |
| S16 | Spherical | Infinite | | | | | |

In example 4, the object-side surface and the image-side surface of any one of the first lens E1 to the fifth lens E6 are aspheric. Table 8 below shows high-order coefficients A4, A6, A8, A10, A12, A14, A16, A18 and A20 applicable to each aspheric surface in example 4, wherein the surface shape of each aspheric surface may be defined by the formula (1) given in the above example 1.

TABLE 8

| Surface number | A4 | A6 | A8 | A10 | A12 |
|---|---|---|---|---|---|
| S1 | 1.4145E−01 | −7.9481E−02 | 4.8701E−03 | 7.5209E−02 | −1.0617E−01 |
| S2 | 1.4822E−01 | −7.4443E−02 | −4.4757E−03 | 6.4217E−02 | 1.0215E−02 |
| S6 | 4.6041E−02 | −1.3042E+00 | 4.4921E+01 | −9.1953E+02 | 1.2151E+04 |
| S7 | 3.1108E−01 | 8.9337E−01 | −2.8639E+01 | 2.9259E+02 | −1.8442E+03 |
| S8 | −7.6796E−02 | 1.5976E+00 | −1.1002E+01 | 5.7808E+01 | −2.1174E+02 |
| S9 | 3.3761E−02 | 2.9672E−01 | −1.0042E+00 | 1.5546E+00 | 5.2913E+00 |
| S10 | −4.9217E−02 | −1.5083E−01 | 2.0554E+00 | −9.5602E+00 | 2.5669E+01 |
| S11 | −3.8282E−01 | 1.4637E+00 | −4.7710E+00 | 1.1966E+01 | −2.6141E+01 |
| S12 | 9.7424E−02 | 9.2400E−01 | −3.4498E+00 | 8.5381E+00 | −1.9644E+01 |
| S13 | 1.9886E−02 | 3.9946E−01 | −1.1672E+00 | 1.8329E+00 | −1.8433E+00 |

TABLE 8-continued

| Surface number | A14 | A16 | A18 | A20 |
|---|---|---|---|---|
| S1 | 8.0935E−02 | −3.9718E−02 | 1.3082E−02 | −2.8826E−03 |
| S2 | −1.7621E−01 | 2.5822E−01 | −1.9701E−01 | 9.0624E−02 |
| S6 | −1.0768E+05 | 6.5264E+05 | −2.7120E+06 | 7.5973E+06 |
| S7 | 7.8671E+03 | −2.3341E+04 | 4.8280E+04 | −6.8337E+04 |
| S8 | 5.2168E+02 | −8.3661E+02 | 8.2126E+02 | −4.2458E+02 |
| S9 | −4.2468E+01 | 1.3013E+02 | −2.2484E+02 | 2.2737E+02 |
| S10 | −4.3784E+01 | 4.8698E+01 | −3.4961E+01 | 1.5335E+01 |
| S11 | 4.9062E+01 | −7.0713E+01 | 7.1964E+01 | −4.9221E+01 |
| S12 | 4.0607E+01 | −6.2670E+01 | 6.5817E+01 | −4.5274E+01 |
| S13 | 1.2580E+00 | −5.9577E−01 | 1.9598E−01 | −4.3924E−02 |

Figures 8A, 8B:
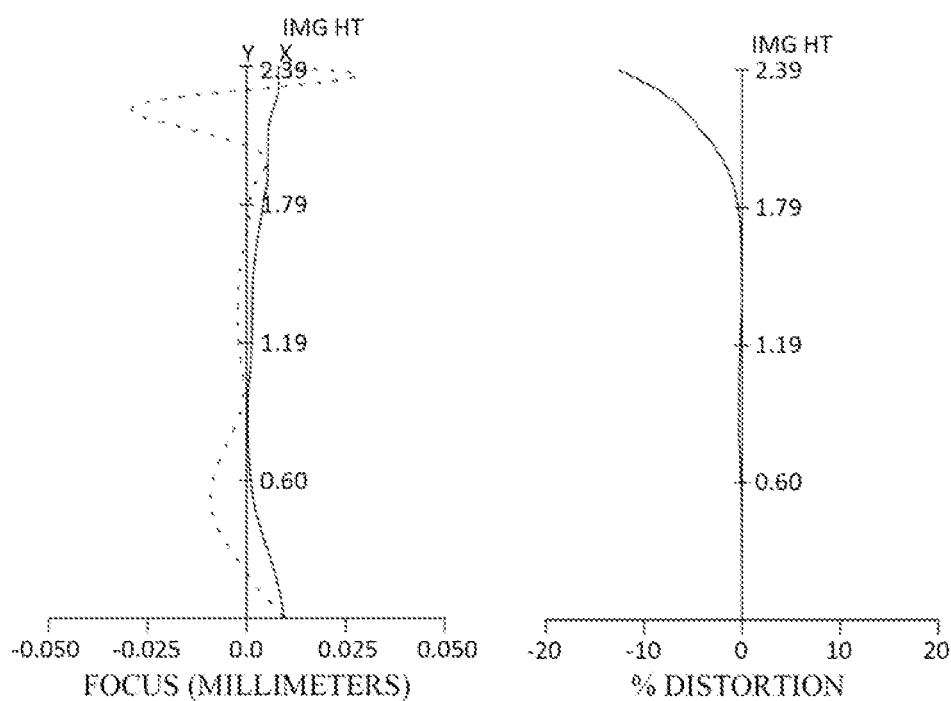
FIGS. 8A to 8C illustrate an astigmatic curve, a distortion curve and a relative illumination curve of the optical imaging lens assembly of the example 4, respectively.
Figure 8C:
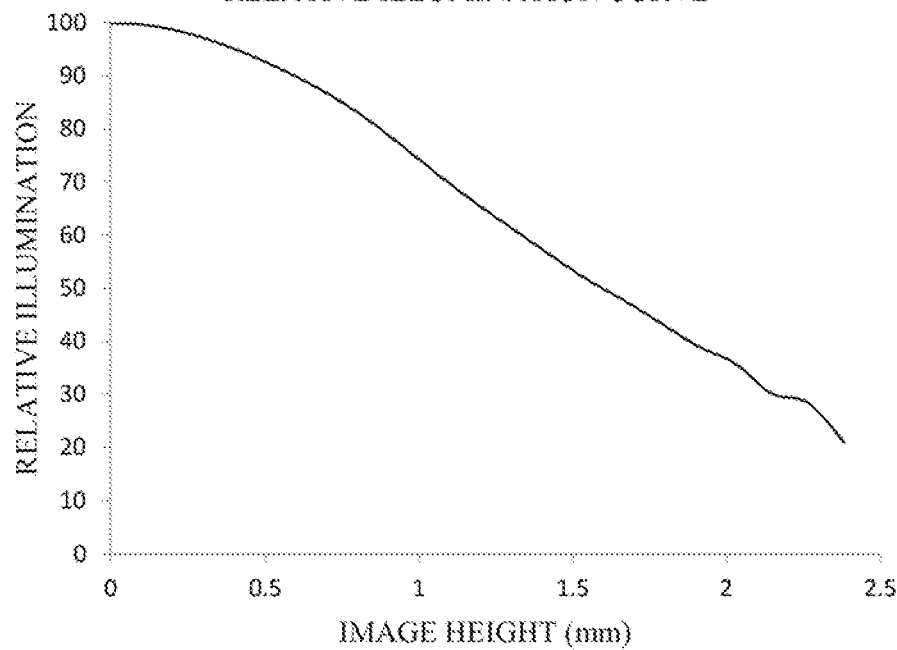

FIG. 8A illustrates the astigmatic curves of the optical imaging lens assembly according to example 4, representing the curvatures of a tangential plane and the curvatures of a sagittal plane. FIG. 8B illustrates a distortion curve of the optical imaging lens assembly according to example 4, representing the amounts of distortion corresponding to different image heights. FIG. 8C illustrates a relative illumination curve of the optical imaging lens assembly according to example 4, representing the relative illumination values corresponding to different image heights. It can be seen from FIG. 8A to FIG. 8C that the optical imaging lens assembly provided in example 4 may achieve good image quality.

Example 5

Figure 9:
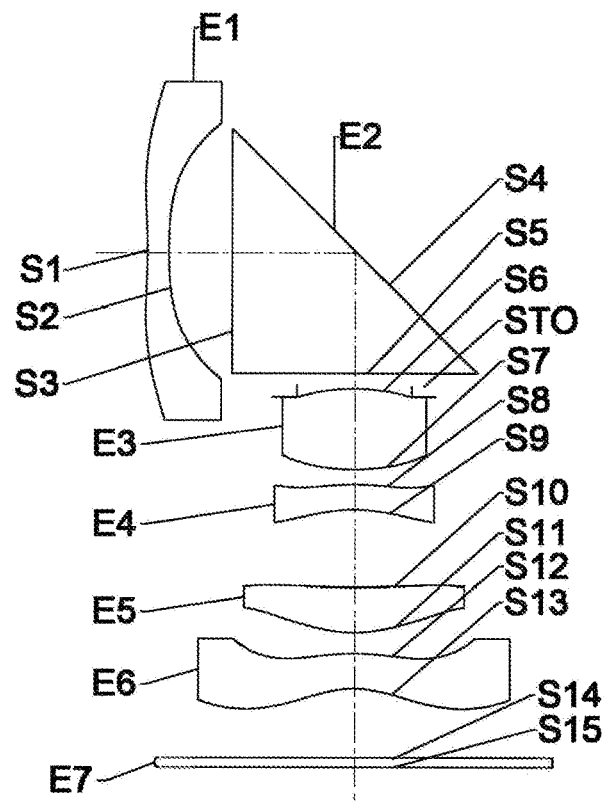
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10C. FIG. 9 is a schematic structural view of the optical imaging lens assembly according to example 5 of the present disclosure.

As shown in FIG. 9, the optical imaging lens assembly includes a first lens E1, a prism E2, a stop STO, a second lens E3, a third lens E4, a fourth lens E5, a fifth lens E6 and an optical filter E7, which are sequentially arranged from an object side to an image side along an optical axis.

The first lens E1 has negative refractive power, an object-side surface S1 thereof is concave, and an image-side surface S2 thereof is concave. An incident surface S3, a reflecting surface S4 and an exit surface S5 of the prism E2 are spherical. The reflecting surface S4 is at 45° with the optical axis, so that the light incident perpendicular to the incident surface S3 of the prism E2 is deflected by 90° by the reflecting surface S4 and then exits from the prism E2 perpendicular to the exit surface S5. The second lens E3 has positive refractive power, an object-side surface S6 thereof is convex, and an image-side surface S7 thereof is convex. The third lens E4 has positive refractive power, an object-side surface S8 thereof is convex, and an image-side surface S9 thereof is concave. The fourth lens E5 has positive refractive power, an object-side surface S10 thereof is concave, and an image-side surface S11 thereof is convex. The fifth lens E6 has negative refractive power, an object-side surface S12 thereof is concave, and an image-side surface S13 thereof is concave. The optical filter E7 has an object-side surface S14 and an image-side surface S15. Light from an object sequentially passes through the respective surfaces S1 to S15 and is finally imaged on an imaging plane S16 (not shown).

In this example, a total effective focal length f of the optical imaging lens assembly satisfies f=2.11 mm, half of a diagonal length ImgH of an effective pixel area on the imaging plane S16 satisfies ImgH=2.39 mm, half of a maximum field-of-view Semi-FOV of the optical imaging lens assembly satisfies Semi-FOV=52.9°, and an aperture value Fno of the optical imaging lens assembly satisfies Fno=2.55.

Table 9 is a table illustrating basic parameters of the optical imaging lens assembly of example 5, wherein the units for the radius of curvature, the thickness/distance and the focal length are millimeter (mm).

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | −5.2563 | 0.2661 | 1.55 | 56.1 | −7.33 | 4.8716 |
| S2 | Aspheric | 17.0824 | 0.6364 | | | | 48.2040 |
| S3 | Spherical | Infinite | 1.6030 | 1.52 | 64.2 | | |
| S4 | Spherical | Infinite | 1.6030 | 1.52 | 64.2 | | |
| S5 | Spherical | Infinite | 0.2713 | | | | |
| STO | Spherical | Infinite | −0.0674 | | | | |
| S6 | Aspheric | 2.0716 | 1.0573 | 1.55 | 56.1 | 2.70 | 0.4353 |
| S7 | Aspheric | −4.2038 | 0.0519 | | | | 10.1532 |
| S8 | Aspheric | 2.0680 | 0.2438 | 1.67 | 20.4 | 435.60 | −44.5872 |
| S9 | Aspheric | 1.9846 | 0.7362 | | | | −6.2282 |
| S10 | Aspheric | −4.1368 | 0.6507 | 1.55 | 56.1 | 2.29 | −5.9009 |
| S11 | Aspheric | −1.0125 | 0.0100 | | | | −0.9992 |
| S12 | Aspheric | −136.0009 | 0.7862 | 1.67 | 20.4 | −1.69 | −3.1313 |
| S13 | Aspheric | 1.1397 | 0.5154 | | | | −6.7283 |

TABLE 9-continued

| Surface number | Surface type | Radius of curvature | Thickness/ Distance | Material Refractive index | Abbe number | Focal length | Conic coefficient |
|---|---|---|---|---|---|---|---|
| S14 | Spherical | Infinite | 0.1100 | 1.52 | 64.2 | | |
| S15 | Spherical | Infinite | 0.1642 | | | | |
| S16 | Spherical | Infinite | | | | | |

In example 5, the object-side surface and the image-side surface of any one of the first lens E1 to the fifth lens E6 are aspheric. Table 10 below shows high-order coefficients A4, A6, A8, A10, A12, A14, A16, A18 and A20 applicable to each aspheric surface in example 5, wherein the surface shape of each aspheric surface may be defined by the formula (1) given in the above example 1.

TABLE 10

| Surface number | A4 | A6 | A8 | A10 | A12 |
|---|---|---|---|---|---|
| S1 | 1.3857E−01 | −5.9584E−02 | −5.0978E−02 | 1.6433E−01 | −1.9576E−01 |
| S2 | 1.4439E−01 | −6.1681E−02 | −1.3934E−02 | −1.4787E−02 | 2.8482E−01 |
| S6 | 4.9970E−02 | −1.3122E+00 | 4.3256E+01 | −8.4724E+02 | 1.0732E+04 |
| S7 | 4.2947E−01 | −3.4563E−01 | −1.4397E+01 | 1.6958E+02 | −1.0992E+03 |
| S8 | −1.2487E−01 | 2.1483E+00 | −1.4459E+01 | 7.5674E+01 | −2.8630E+02 |
| S9 | 4.5528E−03 | 5.1642E−01 | −1.8963E+00 | 4.8337E+00 | −6.2806E+00 |
| S10 | −7.4343E−02 | 1.2674E−01 | 1.1484E−01 | −1.8827E+00 | 6.5572E+00 |
| S11 | −4.7657E−01 | 3.0669E+00 | −1.5866E+01 | 5.6138E+01 | −1.4140E+02 |
| S12 | −5.6346E−03 | 2.1795E+00 | −1.1892E+01 | 4.1797E+01 | −1.0530E+02 |
| S13 | 3.1024E−02 | 3.3304E−01 | −9.9985E−01 | 1.5706E+00 | −1.5632E+00 |

| Surface number | A14 | A16 | A18 | A20 |
|---|---|---|---|---|
| S1 | 1.4067E−01 | −6.6815E−02 | 2.1484E−02 | −4.6358E−03 |
| S2 | −6.1298E−01 | 6.7204E−01 | −4.4729E−01 | 1.8828E−01 |
| S6 | −9.1203E+04 | 5.2979E+05 | −2.1078E+06 | 5.6460E+06 |
| S7 | 4.6989E+03 | −1.3850E+04 | 2.8382E+04 | −3.9795E+04 |
| S8 | 7.5412E+02 | −1.3530E+03 | 1.6085E+03 | −1.2031E+03 |
| S9 | −9.7499E+00 | 6.3439E+01 | −1.3215E+02 | 1.4473E+02 |
| S10 | −1.1621E+01 | 1.0600E+01 | −2.5584E+00 | −4.4345E+00 |
| S11 | 2.5737E+02 | −3.3661E+02 | 3.1106E+02 | −1.9722E+02 |
| S12 | 1.9295E+02 | −2.5356E+02 | 2.3388E+02 | −1.4684E+02 |
| S13 | 1.0479E+00 | −4.8471E−01 | 1.5507E−01 | −3.3693E−02 |

Figures 10A, 10B:
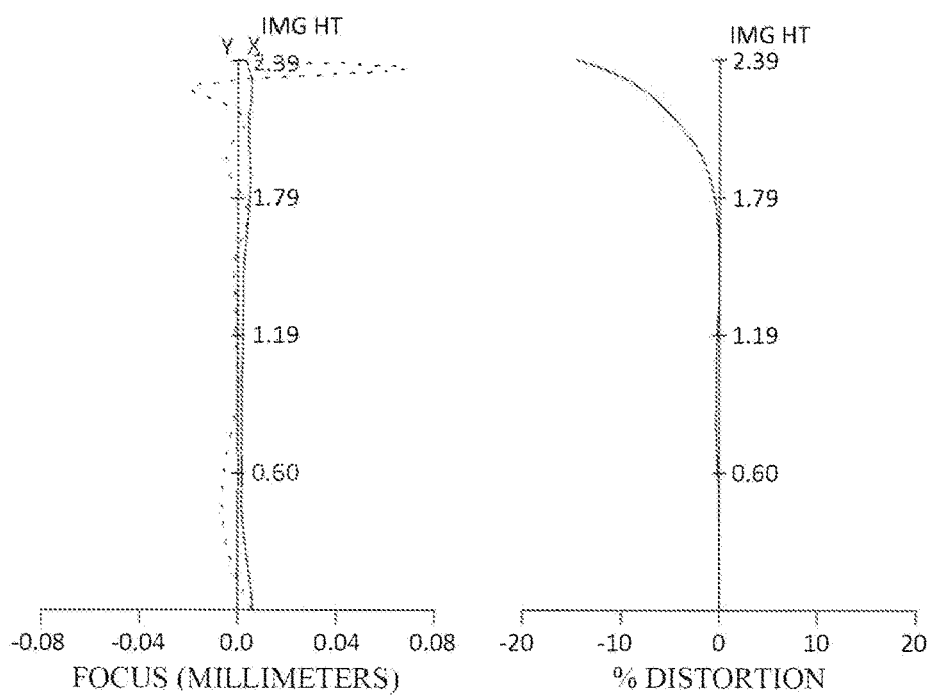
FIGS. 10A to 10C illustrate an astigmatic curve, a distortion curve and a relative illumination curve of the optical imaging lens assembly of the example 5, respectively.
Figure 10C:
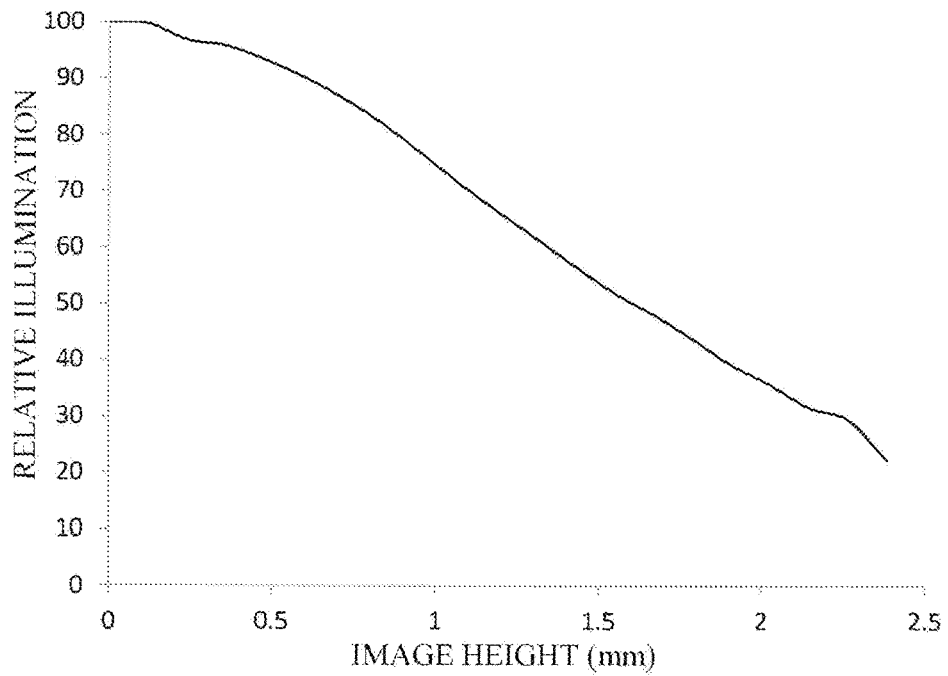

FIG. 10A illustrates the astigmatic curves of the optical imaging lens assembly according to example 5, representing the curvatures of a tangential plane and the curvatures of a sagittal plane. FIG. 10B illustrates a distortion curve of the optical imaging lens assembly according to example 5, representing the amounts of distortion corresponding to different image heights. FIG. 10C illustrates a relative illumination curve of the optical imaging lens assembly according to example 5, representing the relative illumination values corresponding to different image heights. It can be seen from FIG. 10A to FIG. 10C that the optical imaging lens assembly provided in example 5 may achieve good image quality.

Example 6

Figure 11:
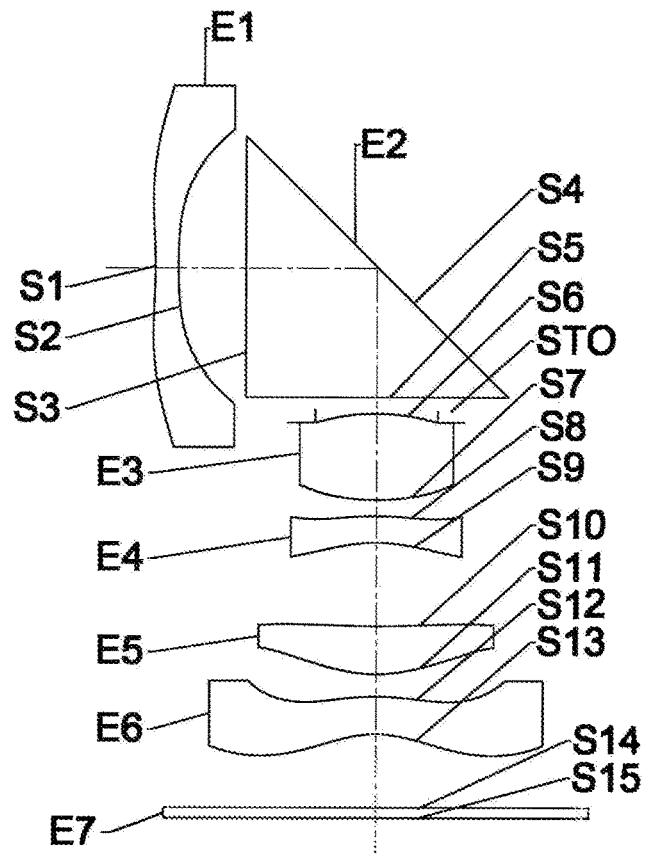
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12C. FIG. 11 is a schematic structural view of the optical imaging lens assembly according to example 6 of the present disclosure.

As shown in FIG. 11, the optical imaging lens assembly includes a first lens E1, a prism E2, a stop STO, a second lens E3, a third lens E4, a fourth lens E5, a fifth lens E6 and an optical filter E7, which are sequentially arranged from an object side to an image side along an optical axis.

The first lens E1 has negative refractive power, an object-side surface S1 thereof is concave, and an image-side surface S2 thereof is convex. An incident surface S3, a reflecting surface S4 and an exit surface S5 of the prism E2 are spherical. The reflecting surface S4 is at 45° with the optical axis, so that the light incident perpendicular to the incident surface S3 of the prism E2 is deflected by 90° by the reflecting surface S4 and then exits from the prism E2 perpendicular to the exit surface S5. The second lens E3 has positive refractive power, an object-side surface S6 thereof is convex, and an image-side surface S7 thereof is convex. The third lens E4 has negative refractive power, an object-side surface S8 thereof is convex, and an image-side surface S9 thereof is concave. The fourth lens E5 has positive refractive power, an object-side surface S10 thereof is concave, and an image-side surface S11 thereof is convex. The fifth lens E6 has negative refractive power, an object-side surface S12 thereof is concave, and an image-side surface S13 thereof is concave. The optical filter E7 has an object-side surface S14 and an image-side surface S15. Light from an object sequentially passes through the respective surfaces S1 to S15 and is finally imaged on an imaging plane S16 (not shown).

In this example, a total effective focal length f of the optical imaging lens assembly satisfies f=2.12 mm, half of a diagonal length ImgH of an effective pixel area on the imaging plane S16 satisfies ImgH=2.25 mm, half of a maximum field-of-view Semi-FOV of the optical imaging lens assembly satisfies Semi-FOV=53.2°, and an aperture value Fno of the optical imaging lens assembly satisfies Fno=3.10.

Table 11 is a table illustrating basic parameters of the optical imaging lens assembly of example 6, wherein the units for the radius of curvature, the thickness and the focal length are millimeter (mm).

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.7813 | 0.2310 | 1.55 | 56.1 | −10.89 | 4.8711 |
| S2 | Aspheric | −209.6477 | 0.7420 | | | | −91.7413 |
| S3 | Spherical | Infinite | 1.7988 | 1.52 | 64.2 | | |
| S4 | Spherical | Infinite | 1.7988 | 1.52 | 64.2 | | |
| S5 | Spherical | Infinite | 0.3044 | | | | |
| STO | Spherical | Infinite | −0.0450 | | | | |
| S6 | Aspheric | 2.2911 | 0.7819 | 1.55 | 56.1 | 2.92 | 0.3338 |
| S7 | Aspheric | −4.6092 | 0.0435 | | | | 10.9322 |
| S8 | Aspheric | 2.1674 | 0.2812 | 1.67 | 20.4 | −49.47 | −46.7744 |
| S9 | Aspheric | 1.9282 | 0.7611 | | | | −6.1588 |
| S10 | Aspheric | −4.6928 | 0.6727 | 1.55 | 56.1 | 2.12 | −12.5910 |
| S11 | Aspheric | −0.9757 | 0.0306 | | | | −1.0690 |
| S12 | Aspheric | −29.5662 | 0.8965 | 1.67 | 20.4 | −1.82 | −3.1313 |
| S13 | Aspheric | 1.2833 | 0.4412 | | | | −6.3181 |
| S14 | Spherical | Infinite | 0.1234 | 1.52 | 64.2 | | |
| S15 | Spherical | Infinite | 0.1609 | | | | |
| S16 | Spherical | Infinite | | | | | |

In example 6, the object-side surface and the image-side surface of any one of the first lens E1 to the fifth lens E6 are aspheric. Table 12 below shows high-order coefficients A4, A6, A8, A10, A12, A14, A16, A18 and A20 applicable to each aspheric surface in example 6, wherein the surface shape of each aspheric surface may be defined by the formula (1) given in the above example 1.

TABLE 12

| Surface number | A4 | A6 | A8 | A10 | A12 |
|---|---|---|---|---|---|
| S1 | 9.8629E−02 | −1.2966E−02 | −7.8605E−02 | 1.3646E−01 | −1.2261E−01 |
| S2 | 1.1392E−01 | −6.9222E−02 | 6.0528E−02 | −8.4352E−02 | 1.2589E−01 |
| S6 | 9.8268E−02 | −7.0856E+00 | 3.3251E+02 | −9.4545E+03 | 1.7593E+05 |
| S7 | 3.2988E−01 | 1.1698E+00 | −3.9617E+01 | 4.8710E+02 | −3.9807E+03 |
| S8 | −1.6785E−01 | 2.7925E+00 | −2.3161E+01 | 1.4326E+02 | −6.4577E+02 |
| S9 | −3.6502E−02 | 8.7538E−01 | −6.0841E+00 | 3.6209E+01 | −1.6734E+02 |
| S10 | −6.0777E−02 | 1.9274E−01 | −1.7310E+00 | −3.8027E+00 | 2.4498E+01 |
| S11 | −3.1606E−01 | 1.5251E+00 | −6.1044E+00 | 1.7121E+01 | −3.5338E+01 |
| S12 | −5.2667E−02 | 1.9829E+00 | −1.1739E+01 | 4.6142E+01 | −1.2457E+02 |
| S13 | 2.6226E−03 | 2.4971E−01 | −6.1925E−01 | 8.7985E−01 | −8.3443E−01 |

| Surface number | A14 | A16 | A18 | A20 |
|---|---|---|---|---|
| S1 | 6.9885E−02 | −2.6748E−02 | 6.9770E−03 | −1.2255E−03 |
| S2 | −1.3113E−01 | 8.9093E−02 | −3.9749E−02 | 1.1592E−02 |
| S6 | −2.2312E+06 | 1.9652E+07 | −1.2027E+08 | 5.0170E+08 |
| S7 | 2.3033E+04 | −9.4611E+04 | 2.7193E+05 | −5.3141E+05 |
| S8 | 2.1288E+03 | −5.1343E+03 | 8.8639E+03 | −1.0337E+04 |
| S9 | 5.6621E+02 | −1.3561E+03 | 2.2156E+03 | −2.3322E+03 |
| S10 | −7.7822E+01 | 1.5314E+02 | −1.9723E+02 | 1.6667E+02 |

TABLE 12-continued

| | | | | |
|---|---|---|---|---|
| S11 | 5.4028E+01 | −5.9878E+01 | 4.6575E+01 | −2.4346E+01 |
| S12 | 2.3224E+02 | −2.9930E+02 | 2.6509E+02 | −1.5812E+02 |
| S13 | 5.5599E−01 | −2.6377E−01 | 8.8286E−02 | −2.0269E−02 |

Figures 12A, 12B:
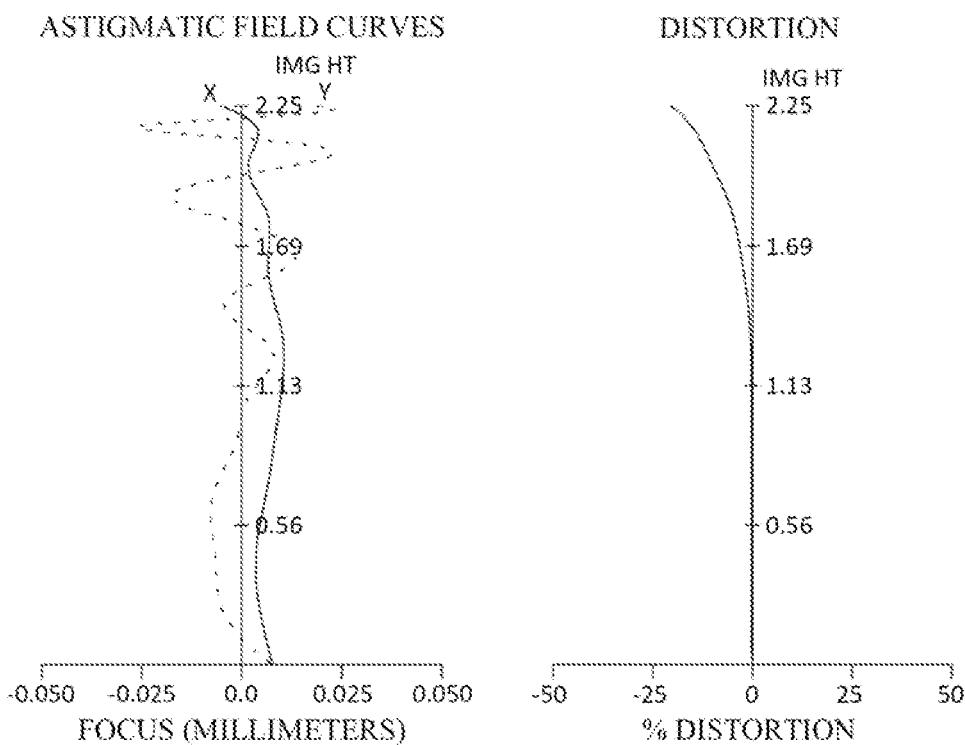
FIGS. 12A to 12C illustrate an astigmatic curve, a distortion curve and a relative illumination curve of the optical imaging lens assembly of the example 6, respectively.
Figure 12C:
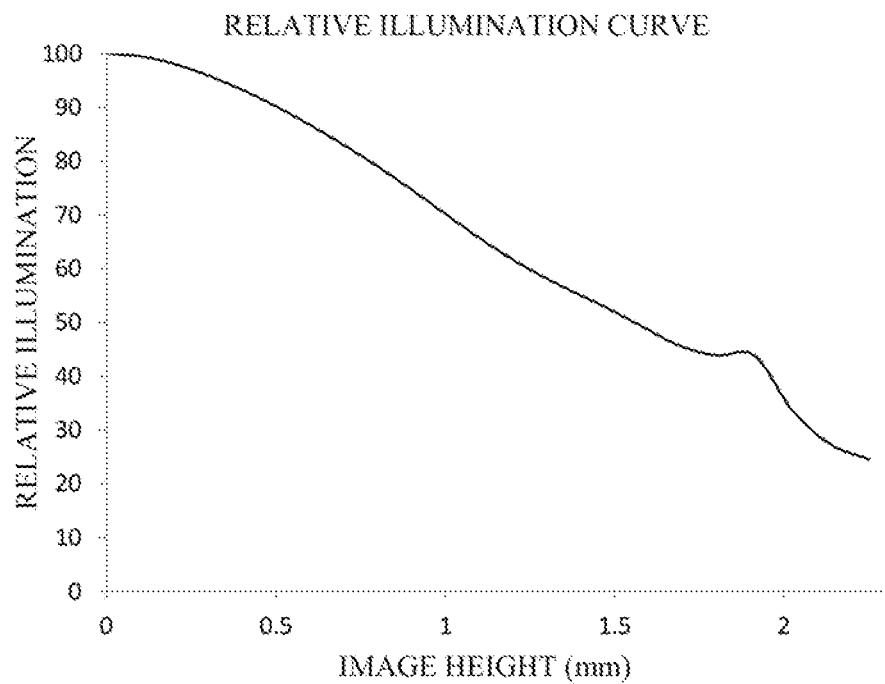

FIG. 12A illustrates then astigmatic curves of the optical imaging lens assembly according to example 6, representing the curvatures of a tangential plane and the curvatures of a sagittal plane. FIG. 12B illustrates a distortion curve of the optical imaging lens assembly according to example 6, representing the amounts of distortion corresponding to different image heights. FIG. 12C illustrates a relative illumination curve of the optical imaging lens assembly according to example 6, representing the relative illumination values corresponding to different image heights. It can be seen from FIG. 12A to FIG. 12C that the optical imaging lens assembly provided in example 6 may achieve good image quality.

In view of the above, examples 1 to 6 respectively satisfy the relationship shown in Table 13.

TABLE 13

| Conditional/Example | 1 | 2 | 3 | 4 | 5 | 6 |
|---|---|---|---|---|---|---|
| FOV (°) | 93.4 | 95.3 | 97.3 | 104.2 | 105.8 | 106.3 |
| f34/f2 | −2.04 | −2.27 | −2.30 | −0.89 | −0.89 | −0.78 |
| f1/f | −1.73 | −2.27 | −4.18 | −3.44 | −3.47 | −5.14 |
| f4/R10 | 2.61 | 3.09 | 3.50 | 2.17 | 2.01 | 1.65 |
| (R1 + R8)/(R1 − R8) | 2.11 | 1.87 | 1.75 | 1.47 | 1.48 | 1.41 |
| R5/R6 | 1.78 | 1.74 | 1.72 | 1.04 | 1.04 | 1.12 |
| CT2/CT3 | 4.25 | 3.25 | 2.00 | 4.33 | 4.34 | 2.78 |
| (SAG11 + SAG12)/(SAG12 − SAG11) | 1.92 | 1.98 | 2.41 | 2.72 | 2.66 | 2.71 |
| (DT11 + DT12)/(DT11 − DT12) | 6.10 | 7.24 | 9.49 | 7.66 | 8.01 | 10.14 |
| (DT51 + DT52)/(DT52 − DT51) | 10.67 | 7.73 | 6.51 | 4.42 | 4.25 | 4.40 |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
 a first lens having negative refractive power;
 a prism having an incident surface, a reflecting surface, and an exit surface, wherein an angle between the reflecting surface and the optical axis is 45°;
 a stop;
 a second lens having positive refractive power;
 a third lens having refractive power;
 a fourth lens having positive refractive power; and
 a fifth lens having negative refractive power,
 wherein −5.50<f1/f<−1.50, where f1 is an effective focal length of the first lens, and f is a total effective focal length of the optical imaging lens assembly,
 wherein 4.00<(DT51+DT52)/(DT52−DT51)<11.00, where DT51 is a maximum effective radius of an object-side surface of the fifth lens, and DT52 is a maximum effective radius of an image-side surface of the fifth lens, and
 wherein a distance on the axis between the incident surface and the reflecting surface of the prism is greater than or equal to 1.41 mm, the distance on the axis between the incident surface and the reflecting surface of the prism being equal to a distance on the axis between the reflecting surface and the exit surface of the prism, and a number of lenses having refractive powers included in the optical imaging lens assembly is five.

2. The optical imaging lens assembly according to claim 1, wherein FOV>92.0°, where FOV is a maximum field-of-view of the optical imaging lens assembly.

3. The optical imaging lens assembly according to claim 2, wherein 92°<FOV<110.0°.

4. The optical imaging lens assembly according to claim 1, wherein the distance on the axis between the incident surface and the reflecting surface of the prism is further less than 1.7988 mm.

5. The optical imaging lens assembly according to claim 1, wherein 1.50<f4/R10<4.00,
where f4 is an effective focal length of the fourth lens, and R10 is a radius of curvature of an image-side surface of the fifth lens.

6. The optical imaging lens assembly according to claim 5, wherein 1.60<f4/R10<3.60.

7. The optical imaging lens assembly according to claim 1, wherein 1.00<(R1+R8)/(R1−R8)<2.50,
where R1 is a radius of curvature of an object-side surface of the first lens, and R8 is a radius of curvature of an image-side surface of the fourth lens.

8. The optical imaging lens assembly according to claim 7, wherein 1.40<(R1+R8)/(R1−R8)<2.20.

9. The optical imaging lens assembly according to claim 1, wherein 1.00<R5/R6<2.00,
where R5 is a radius of curvature of an object-side surface of the third lens, and R6 is a radius of curvature of an image-side surface of the third lens.

10. The optical imaging lens assembly according to claim 1, wherein 1.50<CT2/CT3<4.50,
where CT2 is a center thickness of the second lens along the optical axis, and CT3 is a center thickness of the third lens along the optical axis.

11. The optical imaging lens assembly according to claim 10, wherein 1.90<CT2/CT3<4.50.

12. The optical imaging lens assembly according to claim 1, wherein 1.50< (SAG11+SAG12)/(SAG12−SAG11) <3.00,
where SAG11 is an on-axis distance from an intersection of an object-side surface of the first lens and the optical axis to a vertex of an effective radius of the object-side surface of the first lens, and SAG12 is an on-axis distance from an intersection of an image-side surface of the first lens and the optical axis to a vertex of an effective radius of the image-side surface of the first lens.

13. The optical imaging lens assembly according to claim 1, wherein 6.00<(DT11+DT12)/(DT11−DT12)<10.50,
where DT11 is a maximum effective radius of an object-side surface of the first lens, and DT12 is a maximum effective radius of an image-side surface of the first lens.

* * * * *